United States Patent
Hongu

(10) Patent No.: US 9,253,395 B2
(45) Date of Patent: Feb. 2, 2016

(54) AUTOMATIC FOCUS DETECTION APPARATUS, CONTROL METHOD FOR THE SAME, AND IMAGE PICKUP APPARATUS

(71) Applicant: CANON KABUSHIKI KAISHA, Tokyo (JP)

(72) Inventor: Hideyasu Hongu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 14/134,306

(22) Filed: Dec. 19, 2013

(65) Prior Publication Data

US 2014/0176784 A1    Jun. 26, 2014

(30) Foreign Application Priority Data

Dec. 26, 2012 (JP) ................................. 2012-283666

(51) Int. Cl.
   *H04N 5/232*    (2006.01)
   *G03B 13/00*    (2006.01)
   *G03B 13/36*    (2006.01)

(52) U.S. Cl.
   CPC ....... *H04N 5/23219* (2013.01); *H04N 5/23212* (2013.01); *G03B 13/36* (2013.01)

(58) Field of Classification Search
   None
   See application file for complete search history.

(56) References Cited

U.S. PATENT DOCUMENTS

| | | | |
|---|---|---|---|
| 2008/0025714 A1* | 1/2008 | Ishii | 396/104 |
| 2010/0002128 A1* | 1/2010 | Ishii | 348/349 |
| 2012/0013786 A1* | 1/2012 | Yasuda et al. | 348/349 |
| 2013/0093943 A1* | 4/2013 | Hongu et al. | 348/349 |
| 2014/0139724 A1* | 5/2014 | Yasuda | 348/349 |
| 2014/0168479 A1* | 6/2014 | Ishii et al. | 348/241 |
| 2014/0376813 A1* | 12/2014 | Hongu et al. | 382/195 |

FOREIGN PATENT DOCUMENTS

| | | |
|---|---|---|
| JP | 2009-211311 A | 9/2009 |
| JP | 2010-191084 A | 9/2010 |

* cited by examiner

*Primary Examiner* — Shahbaz Nazrul
(74) *Attorney, Agent, or Firm* — Cowan, Liebowitz & Latman, P.C.

(57) ABSTRACT

In the case where a predetermined subject can be detected from an image with a first detection method but cannot be detected with a second detection method, an in-focus direction of a subject detected with the first detection method is determined during a focusing operation. In the case where, when the predetermined subject becomes detectable with the second detection method, the in-focus direction of the predetermined subject detected with the second detection method has been determined by a determination unit, the focus-detecting operation is started using the determined in-focus direction. Speeding up of the focus-detecting operation that utilizes subject detection results is thereby realized, while suppressing any drop in the image quality of recorded images.

19 Claims, 13 Drawing Sheets

FIG. 2A    FIG. 2B
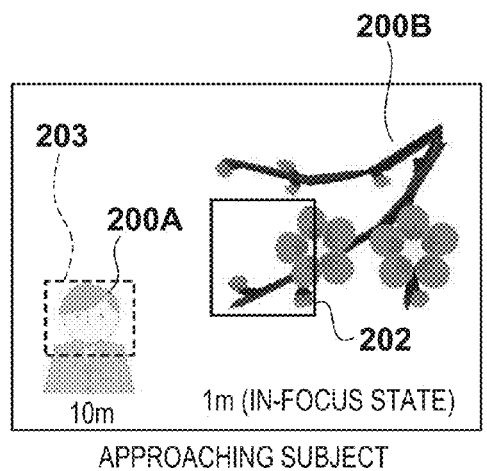
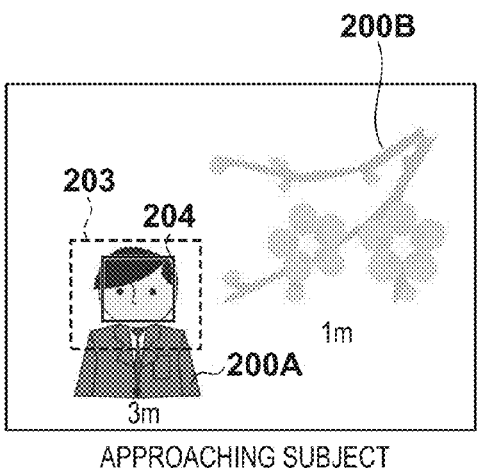
FIG. 2C
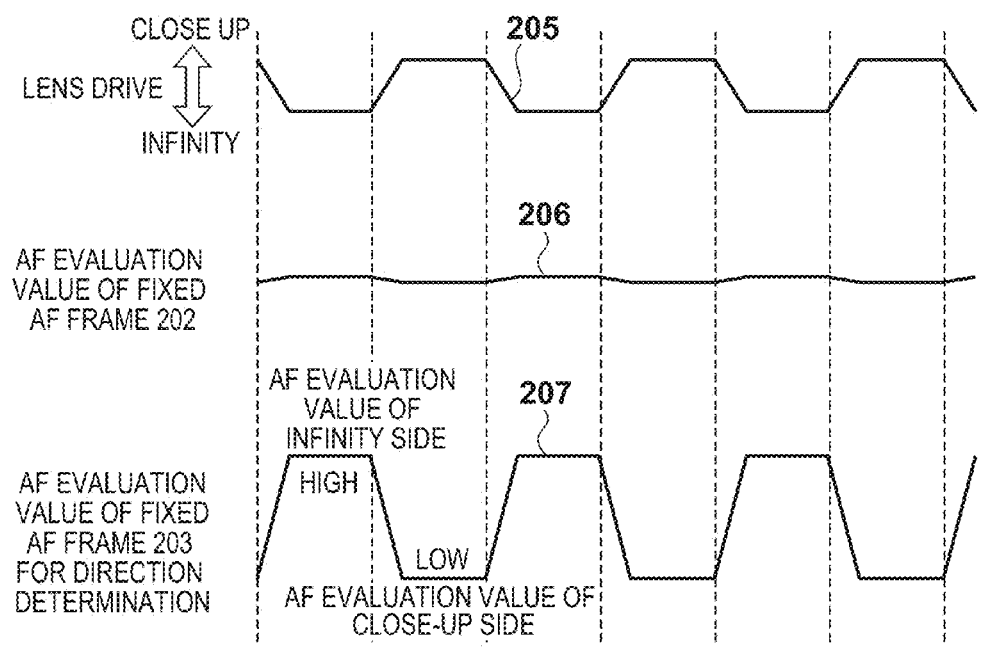

AUTOMATIC FOCUS DETECTION APPARATUS, CONTROL METHOD FOR THE SAME, AND IMAGE PICKUP APPARATUS

BACKGROUND OF THE INVENTION

1. Field of the Invention

The present invention relates to an automatic focus detection apparatus and a control method for the same, and more particularly to an automatic focus detection apparatus that performs focus detection using subject detection results and a control method for the same.

The present invention also relates to an image pickup apparatus to which such an automatic focus detection apparatus and a control method for the same are applied.

2. Description of the Related Art

In the autofocus (AF) control of video cameras and the like, a TV-AF system that detects an in-focus position based on the sharpness (contrast) of image signals generated using an image sensor is widely used. The TV-AF system, specifically, is a system that generates AF evaluation values indicating the degree of contrast with regard to image signals captured at different focusing lens positions, and searches for a position of the focusing lens at which contrast is maximized based on the AF evaluation values as the in-focus position.

Also, automatically detecting a region (subject region) having a specific pattern such as a person's face, for example, from an image, and performing exposure and focus detection on the basis of the detected subject region is known. The specific pattern is not limited to a person's face. For example, an image processing apparatus and method that detect an upper half of a person's body are proposed in Japanese Patent Laid-Open No. 2009-211311.

On the other hand, in order to speed up the focus-detecting operation, a method has been proposed in which search driving of the focusing lens is performed before image capture and the position of a subject that should be in-focus is specified from the AF evaluation values acquired in a plurality of focusing areas (AF frames), and then a focusing operation is performed utilizing this position at the time of image capture (Japanese Patent Laid-Open No. 2010-191084).

In the case where a human body detection method described in Japanese Patent Laid-Open No. 2009-211311 or the like is utilized, detection can be performed even if a person has his or her back turned or with a subject that has accessories or the like on his or her face. However, detection error is higher than with face detection, and the AF frame could possibly be set to an unintended subject.

On the other hand, in the case where the subject that should be in-focus differs before and after image capture, the method described in Japanese Patent Laid-Open No. 2010-191084 does not enable the focus-detecting operation to be sped up. Also, there is a problem in that the focusing lens is also driven to positions away from the in-focus position when search driving is performed during image capture in the case of moving image capture, resulting in blurred images being recorded.

SUMMARY OF THE INVENTION

The present invention remedies one or more of the problems with such conventional technology, and provides an automatic focus detection apparatus and a control method for the same that are able to speed up a focus-detecting operation utilizing subject detection results, while suppressing any drop in the image quality of recorded images.

According to one aspect of the present invention, there is provided an automatic focus detection apparatus comprising: a first detection unit configured to detect a region of a first detection target from an image; a second detection unit configured to detect, from an image, a region of a second detection target in which the first detection target is estimable; a generation unit configured to generate a focusing signal, based on a signal corresponding to a focusing area set within an image; and a control unit configured to control movement of a focusing lens, based on the focusing signal, wherein the control unit determines a first in-focus direction based on a signal corresponding to a region of the second detection target detected in a first period, and wherein, in a case where a focusing area set in a second period that is after the first period corresponds to the region of the second detection target detected in the first period, the control unit controls the focusing lens to move in the first in-focus direction.

According to another aspect of the present invention, there is provided an image pickup apparatus comprising: the automatic focus detection apparatus according to the present invention; an image pickup unit that captures an image; and a drive unit that drives the focusing lens.

According to still another aspect of the present invention, there is provided a method of controlling an automatic focus detection apparatus, comprising: a first detection step of detecting a region of a first detection target from an image; a second detection step of detecting, from an image, a region of a second detection target in which the first detection target is estimable; a generation step of generating a focusing signal, based on a signal corresponding to a focusing area set within an image; and a control step of controlling movement of a focusing lens based on the focusing signal, wherein, in the control step, a first in-focus direction is determined based on a signal corresponding to a region of the second detection target detected in a first period, and wherein, in a case where a focusing area set in a second period that is after the first period corresponds to the region of the second detection target detected in the first period, in the control step, the focusing lens is controlled to move in the first in-focus direction.

Further features of the present invention will become apparent from the following description of exemplary embodiments with reference to the attached drawings.

BRIEF DESCRIPTION OF THE DRAWINGS

FIGS. 2A to 2C are diagrams for describing an outline of an embodiment of the present invention.

DESCRIPTION OF THE EMBODIMENTS

Exemplary embodiments of the present invention will now be described in detail in accordance with the accompanying drawings.

First Embodiment

Figure 1:
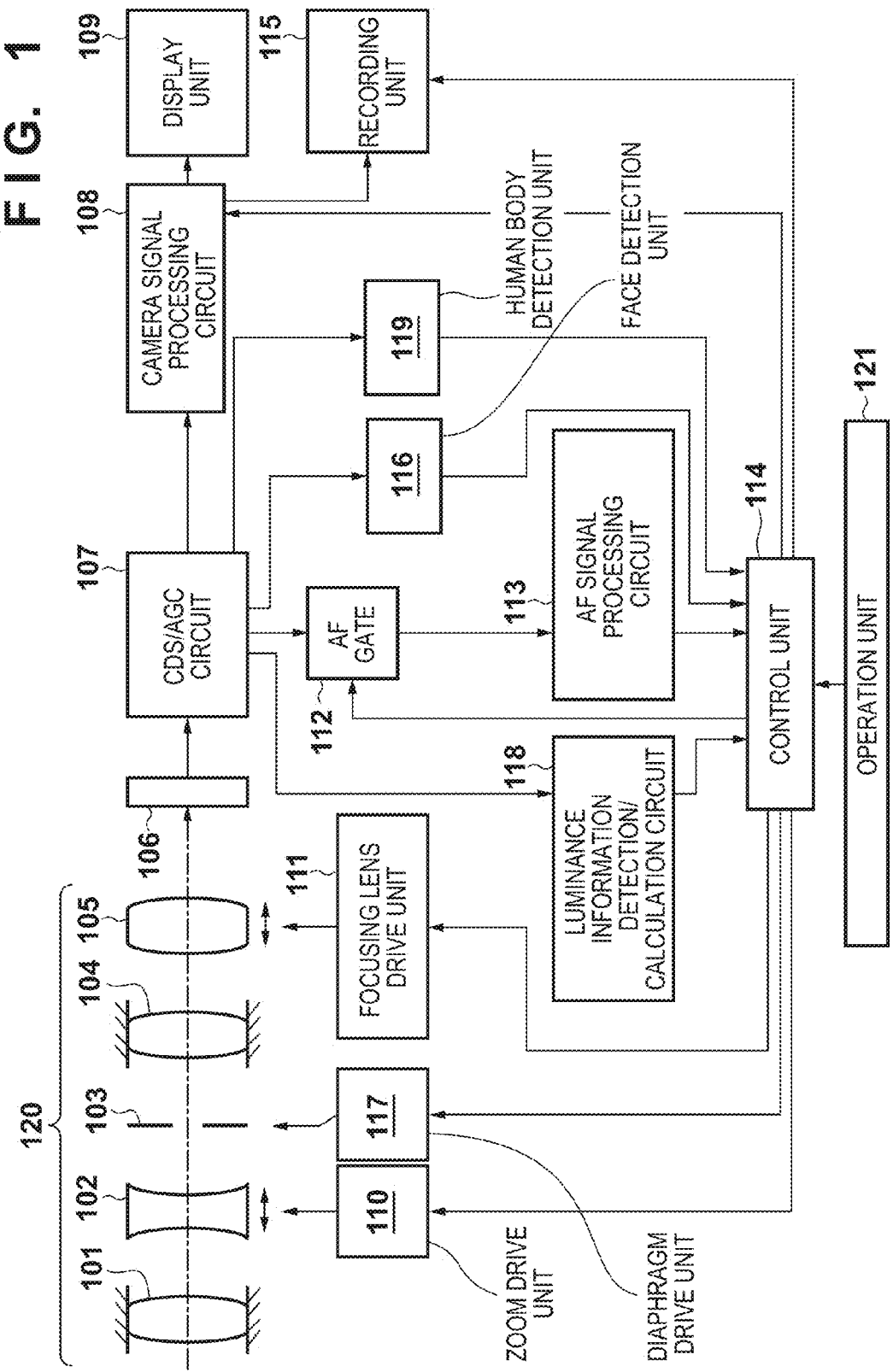
FIG. 1 is a block diagram showing an exemplary functional configuration of a digital video camera serving as an example of an image pickup apparatus to which an automatic focus detection apparatus according to an embodiment of the present invention is applied.

FIG. 1 is a block diagram showing an exemplary functional configuration of a digital video camera serving as an example of an image pickup apparatus to which an automatic focus detection apparatus according to an embodiment of the present invention is applied.

In FIG. 1, a digital video camera 100 of the present embodiment is provided with an image optical system 120 for forming light from a subject into an image. The image optical system 120 is provided with a first fixed lens 101, a variable magnification lens 102 that performs variable magnification by moving in an optical axis direction, a diaphragm 103, a second fixed lens 104, and a focus compensator lens 105. The focus compensator lens (hereinafter, simply "focusing lens") 105 is provided with both a function of correcting movement of a focal plane following variable magnification and a focusing function.

An image sensor 106 is constituted by a photoelectric conversion device such as a CCD sensor or a CMOS sensor. The image sensor 106 photoelectrically converts a subject image formed by the image optical system and outputs an image signal. A CDS/AGC circuit 107 performs correlated double sampling on the output of the image sensor 106, together with gain adjustment.

A camera signal processing circuit 108 performs various types of image processing on the output signal from the CDS/AGC circuit 107 and generates an image signal. A display unit 109 is constituted by an LCD or the like, and displays the image signal from the camera signal processing circuit 108. A recording unit 115 records the image signal from the camera signal processing circuit 108 to a recording medium (magnetic tape, optical disk, semiconductor memory, etc.).

A zoom drive unit 110 moves the variable magnification lens 102 under the control of a control unit 114. A focusing lens drive unit 111 moves the focusing lens 105 under the control of the control unit 114. The zoom drive unit 110 and the focusing lens drive unit 111 are constituted by actuators such as a stepping motor, a DC motor, a vibration motor and a voice coil motor. Also, information on the position of the focusing lens 105 is supplied to the control unit 114 by the focusing lens drive unit 111 of another constituent element.

An AF gate 112 supplies only the signals of an area set by the control unit 114 for use in focus detection (focusing area or AF frame), among the output signals of all pixels from the CDS/AGC circuit 107, to a downstream AF signal processing circuit 113.

The AF signal processing circuit 113 extracts the component of a predetermined frequency band by applying a filter, for example, to signals within the focusing area that are supplied from the AF gate 112, and generates AF evaluation values. The component that is extracted may be a high frequency component or a luminance difference component (difference between maximum and minimum luminance levels of signals passing through AF gate 112), for example.

The AF evaluation values are output to the control unit 114. The AF evaluation values are values representing the sharpness (degree of contrast) of an image that is generated based on the output signals from the image sensor 106. The AF evaluation values can be utilized as values representing the focusing state of the image optical system, because the sharpness of a focused image is high and the sharpness a blurred image is low.

The control unit 114 is a microcomputer, for example, and administers the overall operations of the digital video camera 100, by executing a control program prestored in a ROM not shown and controlling the constituent elements of the digital video camera 100. The control unit 114 controls the focusing lens drive unit 111 and performs AF control processing with the TV-AF system (hereinafter, simply "TV-AF"), based on the AF evaluation values provided from the AF signal processing circuit 113.

A face detection unit 116 applies face detection processing that is based on well-known face detection technology to image signals that are output by the CDS/AGC circuit 107, and detects a face region which is an example of a person region within an image. Well-known face detection technology includes learning-based techniques that utilize neural networks and the like, and techniques that search an image for sites that have characteristic shapes such as eyes, nose and mouth using template matching and regard a region having a high degree of similarity as a face. Another of the numerous techniques that have been proposed involves detecting the amount of image features such as skin color and eye shape and using statistical analysis. Generally a plurality of these techniques are combined to improve the accuracy of face detection. Specific examples include a method disclosed in Japanese Patent Laid-Open No. 2002-251380 that performs face detection utilizing wavelet transforms and image feature amounts. Face detection processing by the face detection unit 116 is performed repeatedly every plurality of frames, but may be performed every frame.

The face detection unit 116 outputs, for each region detected as a person's face (face region), for example, information capable of specifying the position and size of the region within the image, the reliability of the detection result, and the like to the control unit 114 as a face detection result. The control unit 114 instructs the AF gate 112 to set the focusing area to a region that includes a face region within the image, based on this face detection result.

A human body detection unit 119 performs well-known human body detection processing on the image signals, and detects human bodies within a captured screen. The human body detection unit 119 outputs, for each region detected as a human body (human body region), for example, information capable of specifying the position and size of the region within the image, the reliability of the detection result, and the like to the control unit 114 as a human body detection result. In the present embodiment, the control unit 114 estimates a face region based on the human body detection result. While there is no particular restriction on the method of estimating a face region from a human body detection result, in the case where an upper body or a human body shape from the chest up is detected as a human body region, for example, it is possible to discriminate a head region from the shape of the human body region. Since the relationship between sizes or positions of the head region and the face region can be statistically derived in advance, if the head region can be discriminated, this enables the position and size of the face region to be estimated. The control unit 114 determines a final face region, according to the human body detection result and the face detection result. Detection processing by the human body detection unit 119 is performed repeatedly every plurality of frames, but may be performed every frame.

While there is no particular restriction on the method of detecting a human body region with the human body detection unit 119, the method disclosed in Japanese Patent Laid-Open No. 2009-211311 can be used, for example. Specifically, local edge strengths of the contours of the upper body are detected as local feature amounts using a filter such as a Sobel filter, a Prewitt filter or a Haar filter, and it is discriminated whether each person region is an upper body or a non-upper body from the extracted local feature amounts. This discrimination can be implemented based on machine learning such as AdaBoost learning. Note that, in Japanese Patent Laid-Open No. 2009-211311, description is given assuming the use of images captured from diagonally above since images captured by a surveillance camera are targeted, but the technology for detecting a human body region from contours is not limited to images captured from diagonally above.

The present invention is applicable to arbitrary subjects with respect to which a first detection method that detects a region of a specific subject and a second detection method capable of estimating the position of a region of a specific subject can be utilized. The second detection method may be a method that detects a region encompassing a region to be detected with the first detection method, and more particularly detects a region in which the position of a region to be detected with the first detection method can be specified or estimated. Alternatively, the second detection method may be a method with which detection is more likely to be successful than the first detection method but with low detection accuracy or reliability. Also, the specific subject may be an arbitrary subject other than a person.

Also, a partial area that is equivalent to a detection area of the face detection unit 116 is estimated from the detection result acquired by the human body detection unit 119. This estimation method involves estimation by linear transform, based on the relationship between the detection areas of the face detection unit 116 and the human body detection unit 119. In other words, a region defined by a predetermined position or (and) size within the detection area acquired by the human body detection unit 119 is estimated to be a face region.

Accordingly, a configuration may be adopted in which the human body detection unit 119 performs human body detection in a range that encompasses a range in which the face detection unit 116 performs face detection, so as to be able to estimate the position of the person's face from the detected human body region.

Also, the control unit 114, in order to provide the photographer with information on the subject region detected by face detection, human body detection or the like, superimposes a subject region frame on the image signal that is displayed by the display unit 109, for example, via the camera signal processing circuit 108. The subject region frame is thereby displayed on the image in a superimposed manner, and the photographer is able to comprehend the subject region that is detected by the digital video camera 100.

A diaphragm drive unit 117 includes an actuator for driving the diaphragm 103 and a driver thereof. In order to acquire a luminance value of a photometric frame within the screen, a photometric value is acquired by a luminance information detection/computation circuit 118 from the signal read out by the CDS/AGC circuit 107, and the measured photometric value is normalized through computation. The difference between the photometric value and a target value set so as to obtain a proper exposure is calculated in the control unit 114. Thereafter, the control unit 114 calculates a drive correction amount of the diaphragm from the calculated difference, and controls the drive of the diaphragm drive unit 117.

The control unit 114 discriminates detection results relating to the same subject by means such as correlating positions and sizes, with regard to the detection result of the face detection unit 116 and the detection result of the human body detection unit 119. This control unit 114 estimates the position and size of a face from the human body detection result received from the human body detection unit 119. The control unit 114 then integrates detection results discriminated as relating to the same subject, and outputs information on the subject region to the AF gate 112. The AF gate 112 supplies only image signals corresponding to the subject region received from the control unit 114 to the AF signal processing circuit 113.

An operation unit 121 is a group of input devices for a user to input various instructions, settings and the like to the digital video camera 100. The operation unit 121 includes common input devices such as buttons, switches, a touch panel and the like. The control unit 114 executes various operations according to user instructions input via the operation unit 121.

In the above-mentioned configuration, the control unit 114 need only be able to acquire focusing lens positions, AF evaluation values, face detection results, and human body detection results by a certain method. Accordingly, the present embodiment is easily applicable to an existing image pickup apparatus.

Before giving a detailed description, an outline of the present embodiment will be described using FIGS. 2A to 2C.

FIGS. 2A to 2C schematically show focusing lens driving and the change in AF evaluation values in the case where a human subject approaches from a distance in a scene in which a fixed subject exists nearby. Since the human subject's face is initially small or is blurred due to the face not being in focus in such cases, it is highly likely that human body detection can be performed faster than face detection. However, as mentioned above, since the reliability of human body detection is lower than face detection, the AF frame is not set using the human body detection result as the primary subject.

However, by determining the driving direction (in-focus direction) of the focusing lens in advance in the case of focusing on a detected subject utilizing the human body detection result as information on the position of the subject, the in-focus direction no longer needs to be specified again in the case of subsequently focusing on that subject. Conventionally, the required procedure was to determine the in-focus direction after setting the AF frame and start hill-climb driving in the determined direction. On the other hand, in the present embodiment, hill-climb driving can be started immediately after setting the AF frame, enabling the focus-detecting operation to be sped up. Hill-climb driving is an operation that involves moving the focusing lens over the entire driving range at a maximum, and searching for a focusing lens position (in-focus position) at which the AF evaluation value peaks (is maximized).

Specifically, as shown in FIG. 2A, an AF frame 203 for direction determination is set to a subject 200A with respect to which only a human body is detected. Note that the AF frame from which AF evaluation values for driving the focusing lens are acquired is the AF frame that is set to the primary subject. Since the subject 200A to which the AF frame 203 for direction determination is set is not determined to be the primary subject, the focusing lens is not driven using acquired AF evaluation values. On the other hand, in FIG. 2A, since a face cannot be detected, a fixed AF frame 202 defined in advance is set, and AF control is performed so as to focus on a subject 200B in the fixed AF frame 202.

With regard to a captured image that is obtained continuously such as a live view image, for example, AF evaluation values acquired from image signals within the AF frame 203 for direction determination are monitored, and the in-focus direction is determined based on the change in these AF evaluation values. In the example shown in FIG. 2C, since a high AF evaluation value is obtained on the infinity side in the case where the focusing lens is repeatedly driven to the close-up side and infinity side within a minute range, it is possible to specify the in-focus direction as being the infinity side.

When the human subject approaches as shown in FIG. 2B, enabling a face to be detected, it becomes possible to determine a primary subject and set an AF frame, and the AF frame 203 for direction determination is set as the AF frame instead of the fixed AF frame 202. In the case where such a change in AF frames occurs, conventionally it was necessary to perform the following procedure: minute driving→in-focus direction determination based on AF evaluation values obtained from AF frame after the change→hill-climb driving. However, in the present embodiment, because the AF frame for direction determination is set and the in-focus direction is specified at the stage of human body detection before the primary subject is determined, it becomes possible, in the case where the AF frame is subsequently set to the same subject, to start hill-climb driving in the in-focus direction that was specified in advance. In other words, it becomes possible to omit the processes of minute driving and direction determination. It thereby becomes possible to shorten the time required for focus detection and to speed up the focus-detecting operation. Also, this method, which can be implemented by utilizing a typical focus-detecting operation performed on a primary subject, can also be readily applied to conventional apparatuses without needing to modify the focus-detecting operation.

Figure 3:
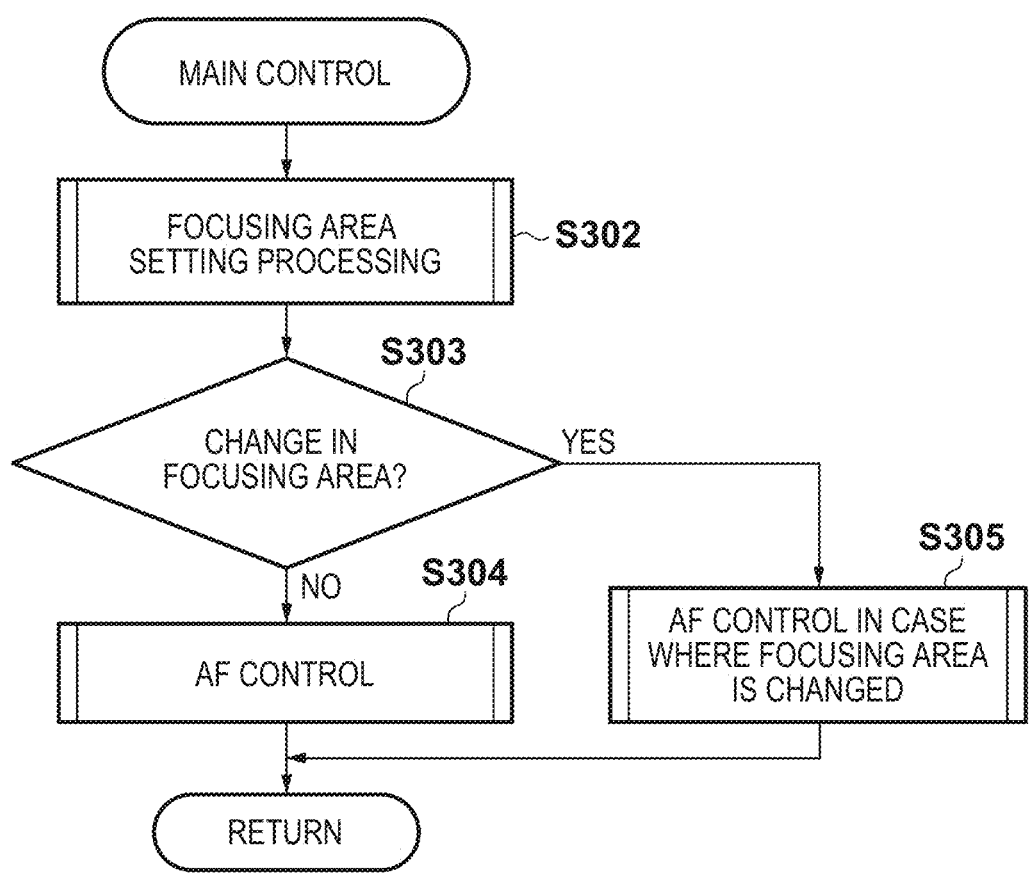
FIG. 3 is a diagram showing main control of an embodiment of the present invention.

FIG. 3 is a flowchart for describing main control processing by the digital video camera 100 of the present embodiment.

At S302, the control unit 114 performs focusing area setting processing for selecting which area within the screen to focus on. Since the focusing area is determined using subject detection results in the present embodiment, this processing can also be called primary subject determination processing. A detailed description will be given later using FIG. 4.

At S303, the control unit 114 determines whether the focusing area has changed as a result of the focusing area setting processing of S302, and branches the processing to S304 if the focusing area has not changed, and to S305 if the focusing area has changed.

At S304, the control unit 114 executes normal AF control, and moves the focusing lens such that the set focusing area is in focus. A detailed description will be given later using FIGS. 5 to 9.

At S305, the control unit 114 executes AF control for when the focusing area has changed. A detailed description will be given later using FIG. 11.

The present embodiment is thus characterized by executing different AF control operations, according to whether or not the focusing area has changed.

Figure 4:
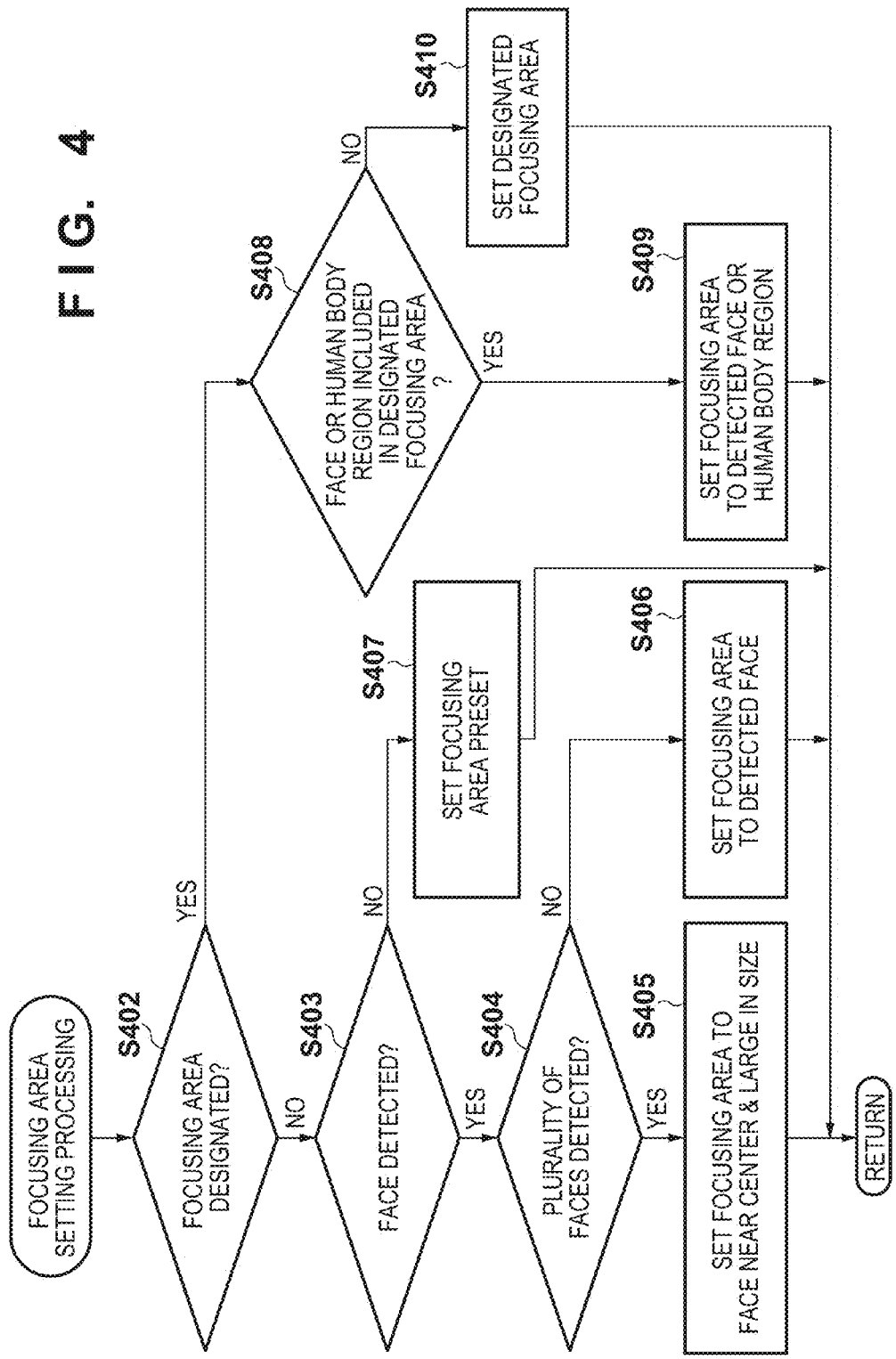
FIG. 4 is a diagram showing processing for setting a focusing area of an embodiment of the present invention.

Next, a detailed description of the focusing area setting processing of S302 will be described, using the flowchart of FIG. 4.

At S402, the control unit 114 determines whether a focusing area has been designated by the user. The control unit 114 respectively transitions the processing to S408 if the user has designated a focusing area via the operation unit 121, and to S403 if this is not the case. There are no particular restrictions on the method by which the user designates the focusing area, and while methods such as using a touch panel to directly designate an area on the display unit 109 on which a live view image is being displayed or using direction keys to select an area are commonly used, other methods may also be employed.

At S403, the control unit 114 determines whether face detection by the face detection unit 116 is successful, and respectively transitions the processing to S407 if a face cannot be detected and to S404 if face detection is successful.

At S404, control unit 114 determines whether a plurality of faces are detected, and respectively transitions the processing to S405 if a plurality of faces are detected and to S406 if only one face is detected.

At S405, the control unit 114 determines a face region to serve as the primary subject among the plurality of face regions that are detected, and sets the focusing area in relation to the face region that was determined as the primary subject. While there is no particular restriction on this method, an exemplary method involves giving more points the closer the position of a face region to the center of the screen and the larger the size of a face region, and determining the face region with the highest points to be the primary subject. Alternatively, the primary subject may be determined based on either the position or size of the face regions. Note that the position of a face region may be the center of the face region (e.g., center of a bounding rectangle or centroid), for example.

At S406, the control unit 114 determines the only face region that is detected to be the primary subject, and sets the focusing area to this face region. Note that other methods of setting the focusing area in case where only one face region is detected may be employed.

At S407, the control unit 114 sets a predefined focusing area whose position is fixed. Note that in the case where a face is not detected, the user may be prompted to designate an area as was mentioned at S402.

At S408, the control unit 114 determines whether a face region or a human body region is included to the designated focusing area, and, if a face region or a human body region is included, transitions the processing to S409 and sets the focusing area to the face region or human body region that is included.

On the other hand, if a face region or a human body region is not included in the designated focusing area, the control unit 114 transitions the processing to S410, and sets the designated focusing area as is.

For example, in the example shown in FIGS. 2A to 2C, since there is no designation of a focusing area by the user (S402, No), and a face was not detected in the state of FIG. 2A (S403, No), the fixed AF frame 202 defined in advance is set (S407). Since one face (S403, Yes→S404, No) is detected when the state changes to FIG. 2B, an AF frame 204 is set with respect to the face region.

Figure 5:
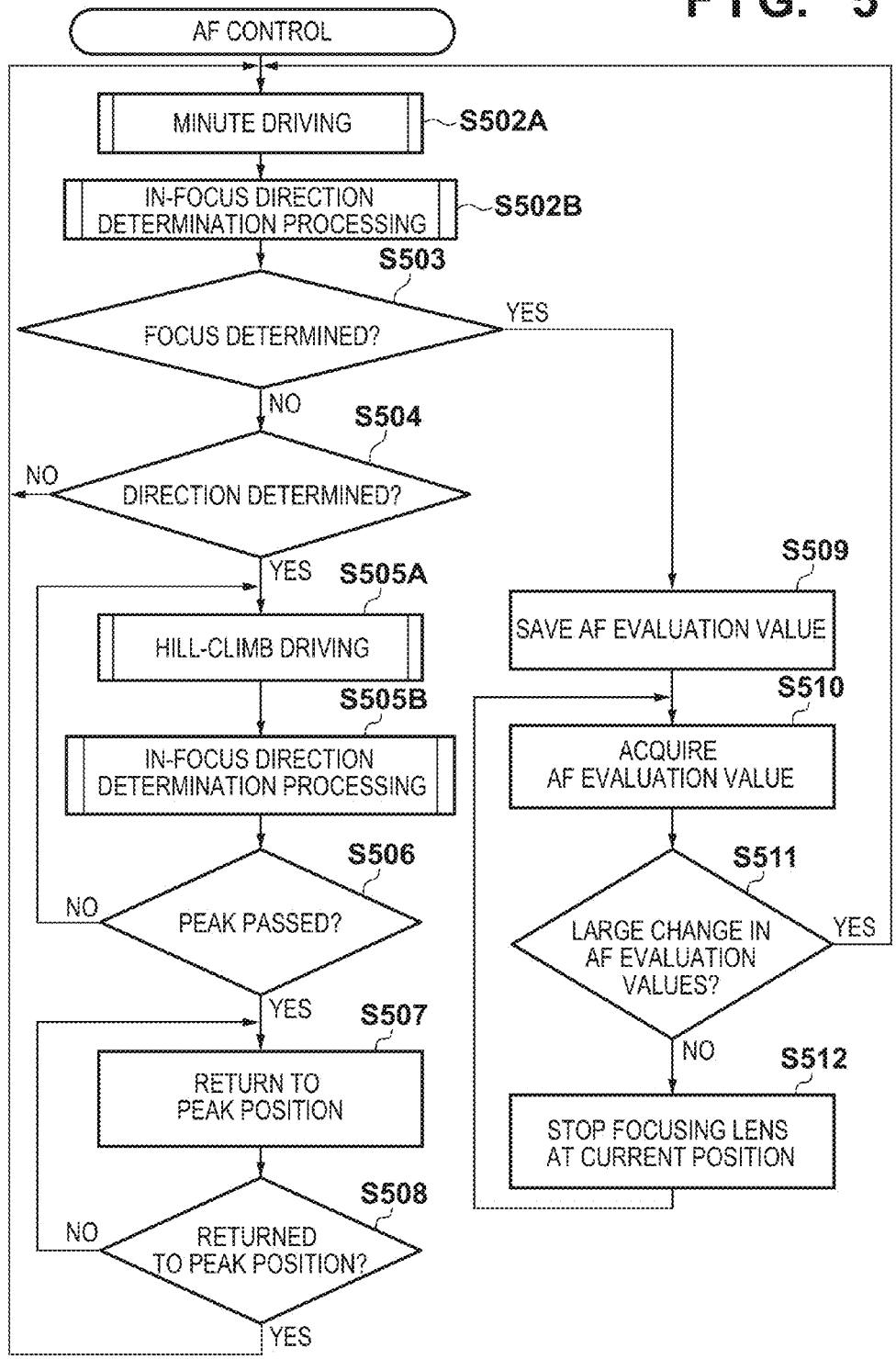
FIG. 5 is a flowchart for describing an AF control operation of a video camera according to an embodiment of the present invention.

Next, a detailed description of AF control that is performed by the control unit 114 at S304 of FIG. 3 will be given using the flowchart shown in FIG. 5.

At S502A, the control unit 114 performs a minute driving operation. The minute driving operation is an operation that involves driving the focusing lens within a minute range centered on the current position thereof and acquiring AF evaluation values. Usually, the driving range of the focusing lens is smaller than the hill-climb driving operation.

At S502B, the control unit 114 determined whether the subject is in focus, and, if not in focus, in which of the close-up or infinity direction the in-focus point lies, utilizing the variation in AF evaluation values resulting from the minute driving performed at S502A. A detailed description of the minute driving operation will be given later using FIGS. 6A and 6B.

At S503, the control unit 114 branches the processing according to the determination result at S502B. If it is determined by the minute driving operation of S502A that the subject is in focus, the control unit 114 advances the processing to S509, and otherwise advances the processing to S504.

At S504, the control unit 114 further branches the processing depending on whether the in-focus direction can be determined in the minute driving operation of S502A. That is, the control unit 114 advances the processing to S505A if the in-focus direction can be determined, and returns the processing to S502A and continues the minute driving operation if the in-focus direction cannot be determined.

At S505A, the control unit 114 controls the focusing lens drive unit 111, and performs hill-climb driving of the focusing lens at high speed in the direction in which the AF evaluation values increase. A detailed description of the hill-climb driving operation will be given later using FIG. 8.

At S505B, the control unit 114 performs in-focus direction determination processing, utilizing the variation in evaluation values resulting from the hill-climb driving performed at S505A.

At S506, the control unit 114 determines whether the peak of the AF evaluation values has been passed in the hill-climb driving operation performed at S505A. If it is determined that the peak has been passed, the control unit 114 advances the processing to S507, and otherwise continues the hill-climb driving operation of S505A.

At S507, the control unit 114 controls the focusing lens drive unit 111, and returns the focusing lens 105 to the lens position at which the AF evaluation value obtained in the hill-climb driving operation peaked (was maximized). At S508, the control unit 114 checks whether the focusing lens 105 has returned to the position where the AF evaluation value is maximized. The control unit 114 returns the processing to S502 and again continues the minute driving operation if the focusing lens 105 has returned, and returns the processing to S507 and continues the operation of returning the position of the focusing lens 105 if the focusing lens 105 has not yet returned.

Next, the focusing operation from S509 will be described.

At S509, the control unit 114 holds the AF evaluation value from the AF signal processing circuit 113. At S510, the control unit 114 acquires the latest AF evaluation value from the AF signal processing circuit 113. At S511, the control unit 114 compares the AF evaluation value held at S509 with the AF evaluation value newly acquired at S510, and determined whether the variation in AF evaluation values is large. Specifically, the control unit 114 determines that change is large if there is a difference greater than or equal to a predetermined value between the AF evaluation values, and returns the processing to S502A and resumes the minute driving operation. On the other hand, if it is not determined that the variation in AF evaluation values is large, the control unit 114 controls the focusing lens drive unit 111 to stop the focusing lens 105, and returns the processing to S510.

Figure 6A:
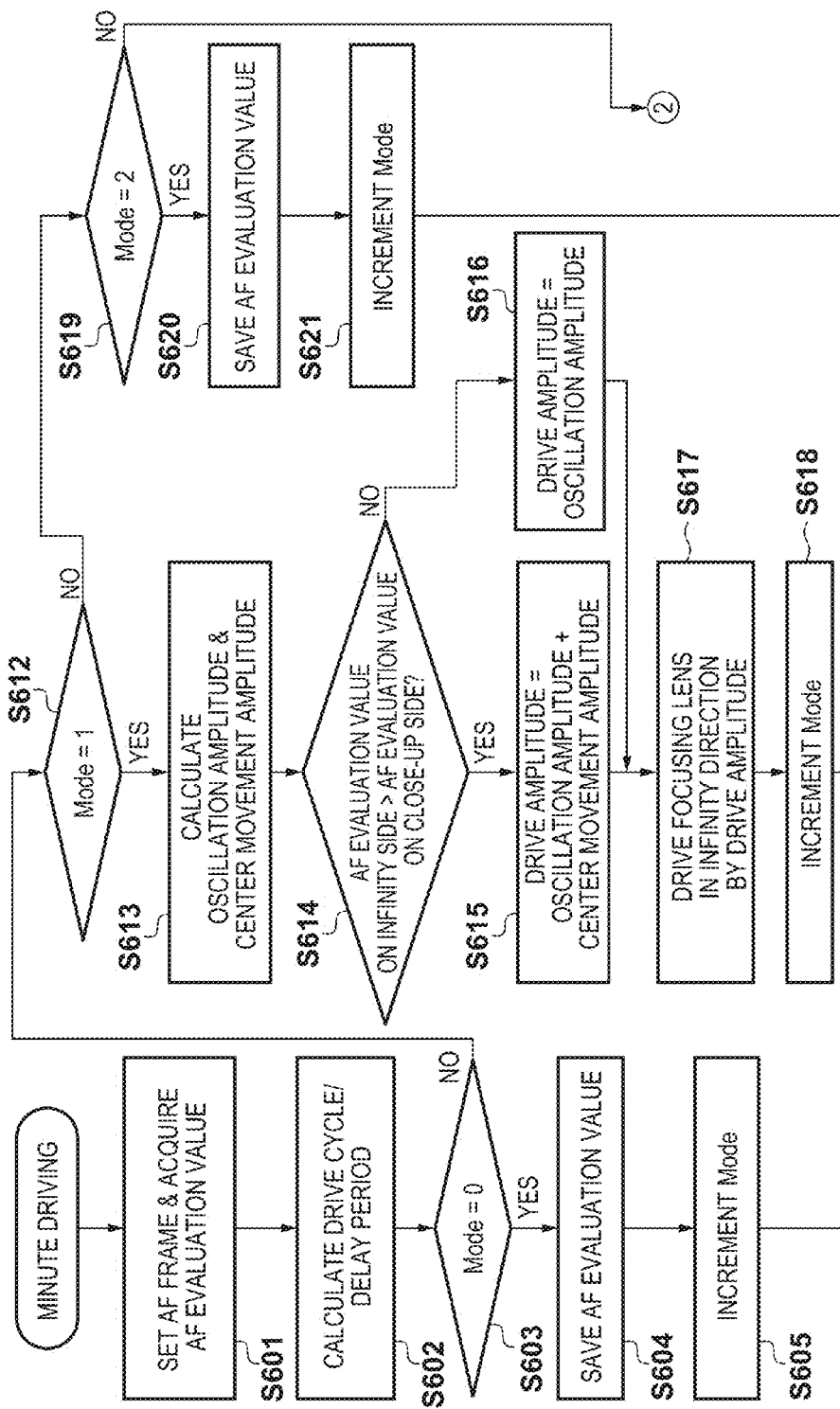
FIGS. 6A and 6B are flowcharts showing processing for performing a minute driving operation of an embodiment of the present invention.
Figure 6B:
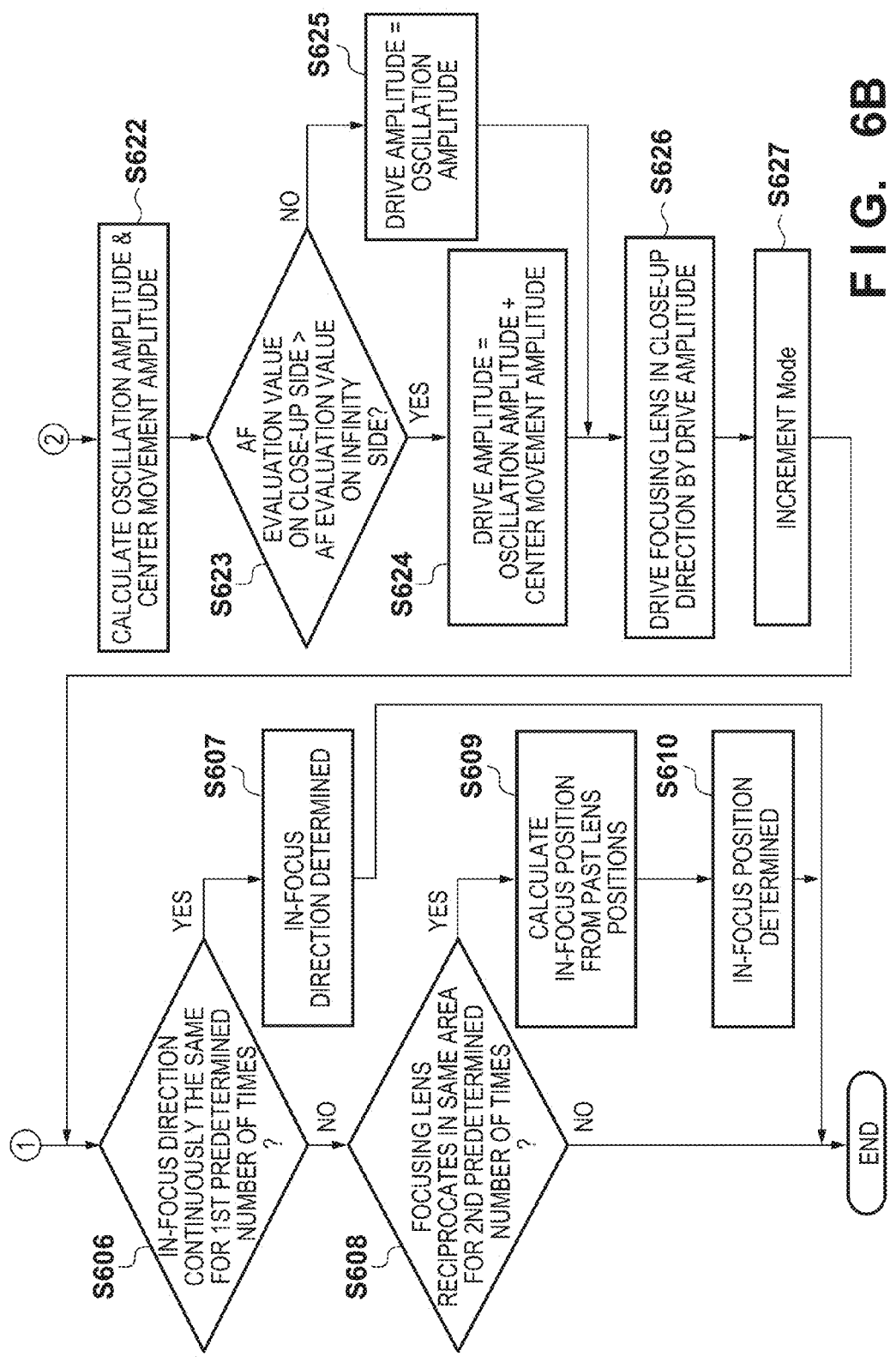

Next, the minute driving operation performed at S502 in FIG. 5 will be described using the flowcharts shown in FIGS. 6A and 6B.

At S601, the control unit 114 sets the AF gate 112 so as to supply only image signals from within the AF frame (focusing area) set at S302 in FIG. 3 to the AF signal processing circuit 113. Also, the control unit 114 acquires AF evaluation values generated by the AF signal processing circuit 113 based on the image signals from within the AF frame.

At S602, the control unit 114 derives a drive cycle and drive delay period. The drive delay period is a time period from when a vertical synchronizing signal is output until when the drive of the focusing lens is started.

At S603, the control unit 114 discriminates whether the current value of a variable Mode is 0, and, if 0, advances the processing to S604 and performs processing at the focusing lens position on the close-up side discussed later, and otherwise advances the processing to S612.

Processing at Focusing Lens Position on Close-up Side

At S604, the control unit 114 saves the AF evaluation value as the infinity-side AF evaluation value (AF evaluation value based on sensor output accumulated when the focusing lens is located on the infinity side).

At S605, the control unit 114 adds 1 to Mode (or returns Mode to 0 if Mode≥4), and advances the processing to S606.

Common Processing

At S606, the control unit 114 advances the processing to S607 if the same direction is continuously judged to be the in-focus direction for a first predetermined number of times, and otherwise advances the processing to S608.

In S608, the control unit 114 advances the processing to S609 if the focusing lens repeatedly reciprocates in the same area for a second predetermined number of times, and otherwise ends the processing, having assumed that neither the in-focus direction nor the in-focus position can be determined. Here, the first predetermined number of times and the second predetermined number of times may be the same number of times or may be different numbers of times. Also, this determination may be a determination as to whether the position of the focusing lens is within a predetermined range for a predetermined time period.

At S607, the control unit 114 ends the processing, having assumed that the in-focus direction was determined, and shifts to hill-climb driving.

In S609, the control unit 114 computes the mean position of the focusing lens positions for the previous second predetermined number of times as the in-focus point. At S610, the control unit 114 ends the processing and shifts to focusing stop/restart determination, having assumed that the in-focus position was determined.

At S612, the control unit 114 discriminates whether the current value of Mode is 1, and, if 1, advances the processing to S613 and drives the focusing lens discussed later in the infinite direction, and otherwise advances the processing to S619.

Processing for Driving Focusing Lens to Infinity Side

At S613, the control unit 114 computes the oscillation amplitude and center movement amplitude. While a detailed description is not given here, generally the amplitude is reduced when the depth is small and increased when the depth is large, on the basis of the depth of focus.

At S614, the control unit 114 compares the aforementioned infinity-side AF evaluation value at Mode=0 with a close-up-side AF evaluation value at Mode=2 discussed later, and, if the infinity-side AF evaluation value is greater than the close-up-side AF evaluation value, advances the processing to S615, and otherwise advances the processing to S616.

At S615, the control unit 114 sets the drive amplitude to "drive amplitude=oscillation amplitude+center movement amplitude".

At S616, the control unit 114 sets the drive amplitude to: "drive amplitude=oscillation amplitude".

At S617, the control unit 114 determines to drive the focusing lens in the infinity direction by the amplitude set at S615 or S616.

At S618, the control unit 114 adds 1 to Mode (or returns Mode to 0 if Mode≥4), and advances the processing to S606. The processing from S606 is as aforementioned.

At S619, the control unit 114 discriminates whether the current value of Mode is 2, and, if 2, advances the processing to S620 and performs processing at the focusing lens position on the infinity side discussed below, and otherwise advances the processing to S622.

Processing at Focusing Lens Position to Infinity Side

At S620, the control unit 114 saves the AF evaluation value as a close-up-side AF evaluation value (AF evaluation value based on sensor output accumulated when focusing lens is located on close-up side).

At S621, the control unit 114 adds 1 to Mode (or returns Mode to 0 if Mode≥4), and advances the processing to S606. The processing from S606 is as aforementioned.

Processing for Driving Focusing Lens on Close-up Side

At S622, the control unit 114 computes the oscillation amplitude and center movement amplitude. While a detailed description is not given here, generally the amplitude is reduced when the depth is small and increased when the depth is large, on the basis of the depth of focus.

At S623, the control unit 114 compares the aforementioned infinity-side AF evaluation value at Mode=0 with the aforementioned close-up-side AF evaluation value at Mode=2, and, if the close-up-side AF evaluation value is greater than the infinity-side AF evaluation value, advances the processing to S624, and otherwise advances the processing to S625.

At S624, the control unit 114 sets the drive amplitude to "drive amplitude=oscillation amplitude+center movement amplitude".

At S625, the control unit 114 sets the drive amplitude to "drive amplitude=oscillation amplitude".

At S626, the control unit 114 determines to drive the focusing lens in the close-up direction by the amplitude set at S624 or S625.

At S627, the control unit 114 adds 1 to Mode (or returns Mode to 0 if Mode≥4), and advances the processing to S606. The processing from S606 is as aforementioned.

Figure 7:
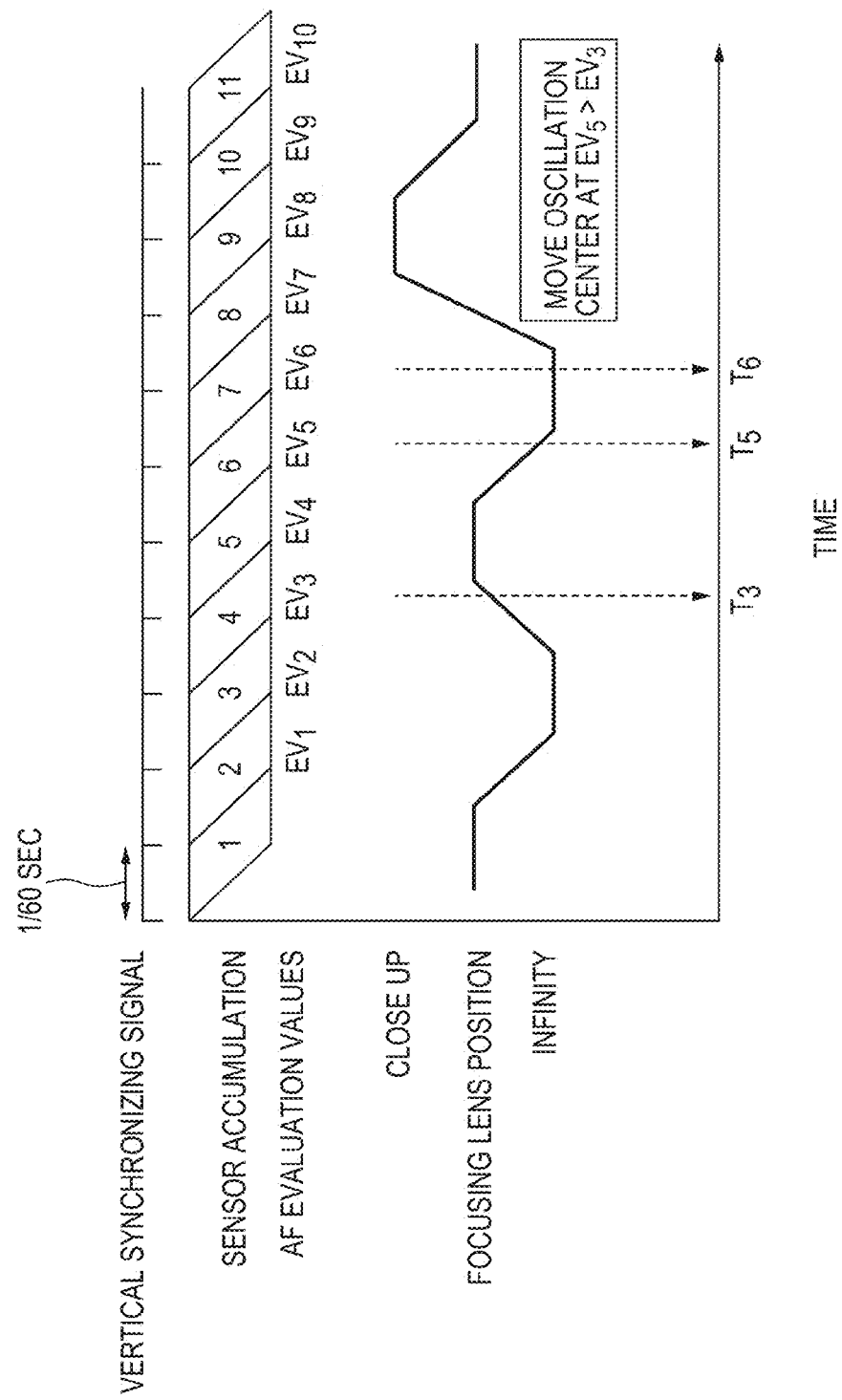
FIG. 7 is a diagram showing a minute driving operation of an embodiment of the present invention.

The elapse of time during the abovementioned focusing lens operations is shown in FIG. 7. Here, the horizontal axis is time, the periods marked off with a downward dash at the very top denote the vertical synchronizing signal of the image signal, and the rhombus shapes thereunder denote the accumulation periods of the image sensor 106 (here, illustrated with a CMOS sensor). $EV_x$ is the AF evaluation value that is obtained at the timing of each accumulation period, and at the very bottom is the focusing lens position. Since the CMOS sensor employs a system of operating the shutter every scan line (rolling shutter system), the timing of the accumulation periods and the transfer periods differs between the upper portion and the lower portion of the screen, as shown in the diagram. The rhombus shapes in FIG. 7 represent these accumulation periods.

In the present embodiment, the AF evaluation values are monitored while moving the focusing lens to the close-up side and the infinity side as shown in FIG. 7, and the focusing lens is driven in the in-focus direction. However, since the AF evaluation values need to be obtained from image signals that are based on electric charge accumulated in the image sensor 106 while the focusing lens is positioned on the close-up/infinity side, the timing at which the focusing lens is driven needs to be aligned with the accumulation period of the image sensor 106. The focusing lens is not positioned on the close-up/infinity side for the entire accumulation period of the image sensor 106, but because the AF frame is set to be smaller than the captured screen, there is sufficient accumulation of scan lines within the AF frame.

An AF evaluation value $EV_3$ for the electric charge accumulated in the image sensor 106 during an accumulation period 3 is imported at time $T_3$, and an AF evaluation value $EV_5$ for the electric charge accumulated in the image sensor 106 during an accumulation period 5 is imported at time $T_5$. At time $T_6$, the AF evaluation values $EV_3$ and $EV_5$ are compared, and the oscillation center is moved if $EV_5 > EV_3$ and is not moved if $EV_3 \geq EV_5$. Discrimination of the in-focus direction and the in-focus position are thus performed.

Figure 8:
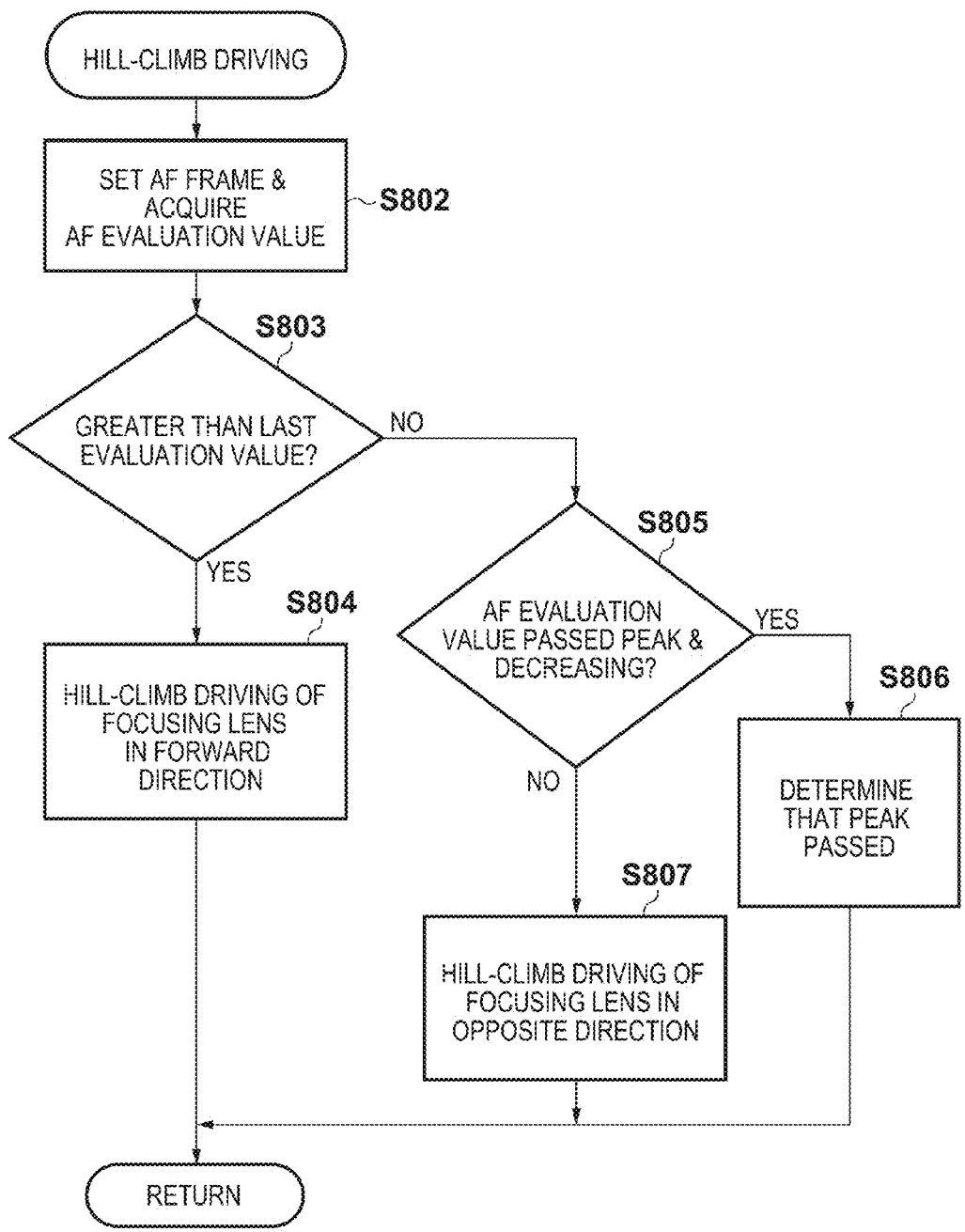
FIG. 8 is a flowchart showing processing for performing a hill-climb driving operation of an embodiment of the present invention.

Next, the hill-climb driving operation performed at S505 in FIG. 5 will be described using the flowchart shown in FIG. 8.

Also in the hill-climb driving operation, similarly to minute driving operation, the control unit 114 first sets an AF frame and acquires AF evaluation values in accordance with the settings (S802). Next, the control unit 114 evaluates the sizes of the AF evaluation value acquired last time and the AF evaluation value acquired this time (S803), and branches the processing.

If the AF evaluation value acquired this time is greater than the AF evaluation value acquired last time, the control unit 114, at S804, controls the focusing lens drive unit 111 to perform hill-climb driving of the focusing lens 105, that is, to move the focusing lens 105 at a predetermined speed, in the same direction as last time (forward direction), and ends the processing.

On the other hand, if the AF evaluation value acquired this time is less than or equal to the AF evaluation value acquired last time, the control unit 114, at S805, determines whether the AF evaluation value has passed its peak and decreased. If it is determined that the AF evaluation value has passed its peak and decreased, the control unit 114 then advances to S806 and ends the processing due to the AF evaluation value having passed its peak.

If it is not determined at S805 that the AF evaluation value has passed its peak and decreased, the control unit 114, at S807, controls the focusing lens drive unit 111 to perform hill-climb driving of the focusing lens 105, that is, to move the focusing lens 105 at a predetermined speed, in the opposite direction to last time, and ends the processing.

Figure 9:
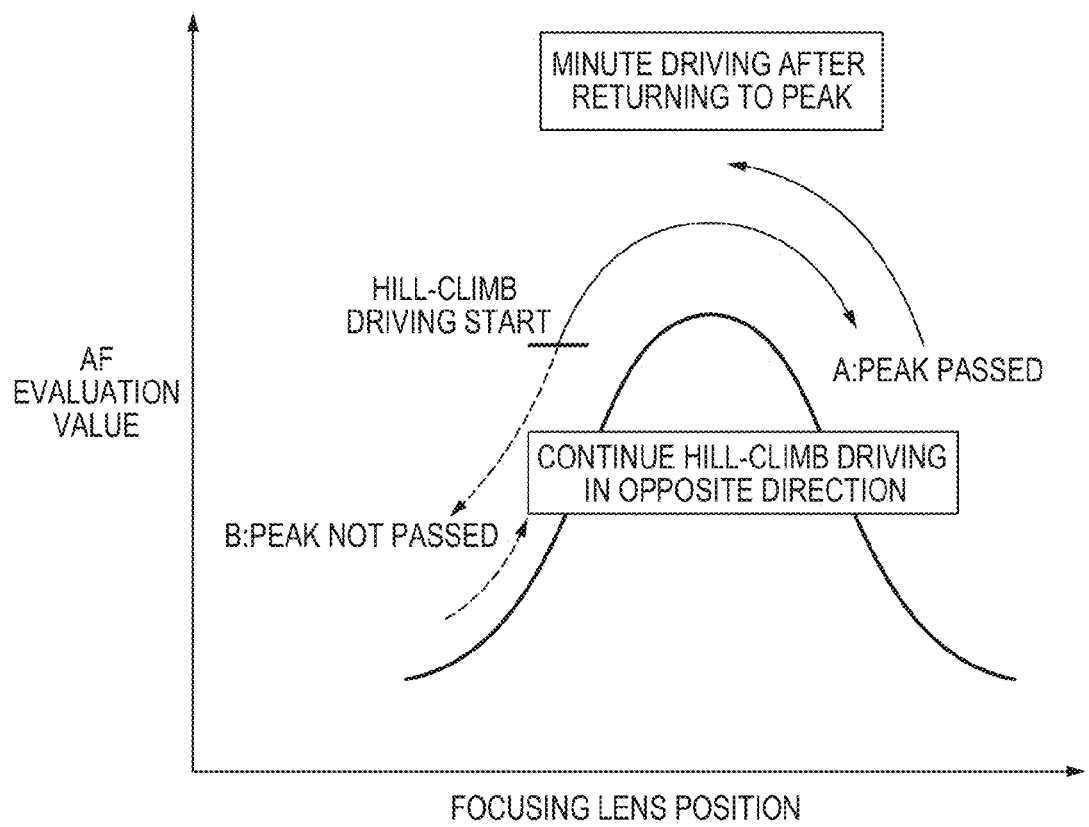
FIG. 9 is a diagram showing a hill-climb driving operation of an embodiment of the present invention.
Figure 10:
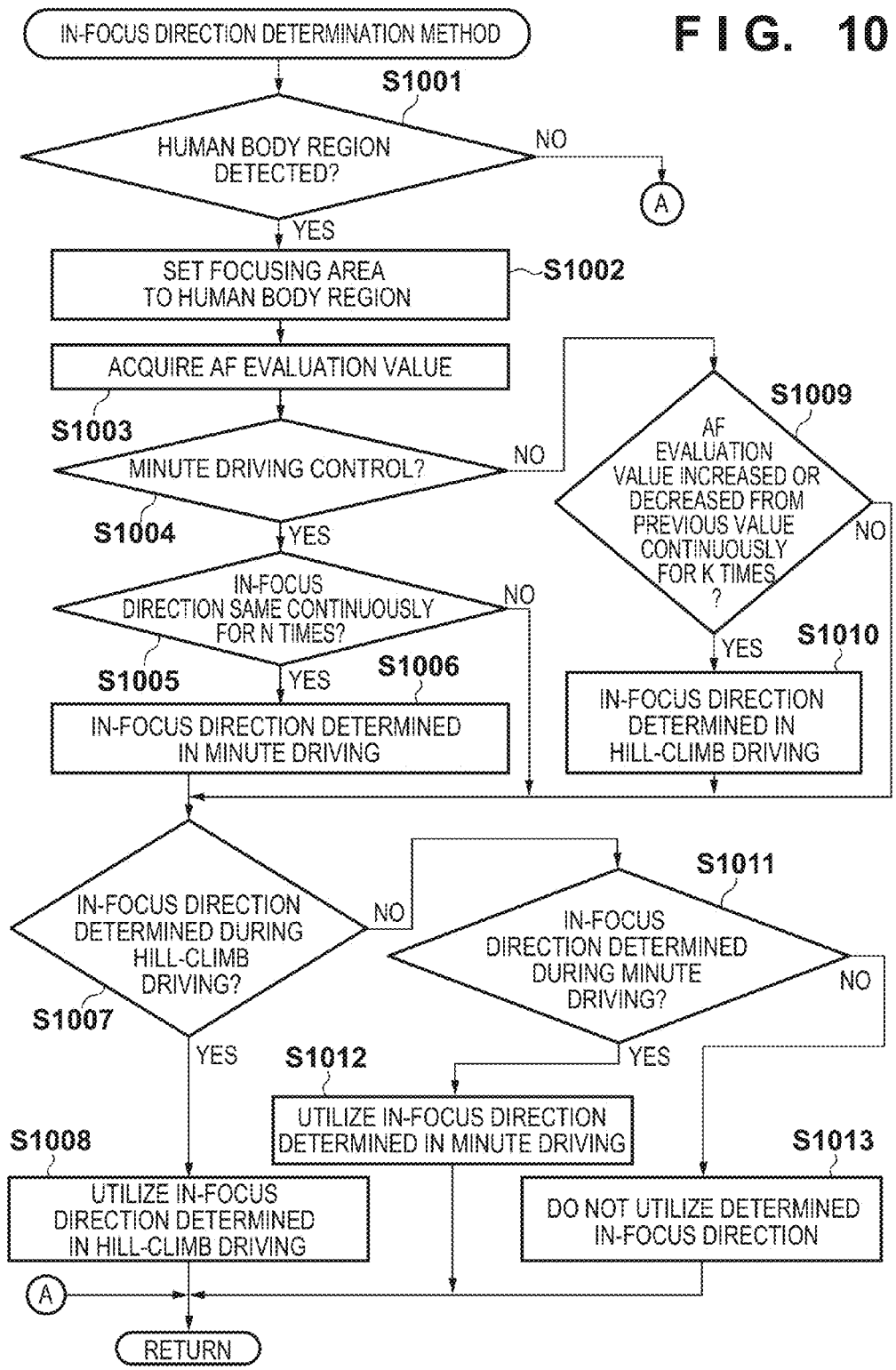
FIG. 10 is a diagram showing processing for determining an in-focus direction of an embodiment of the present invention.

FIG. 9 is a diagram showing an example of the size of the AF evaluation value during the hill-climb driving operation and an exemplary drive operation of the focusing lens 105.

In FIG. 9, in the case where the focusing lens 105 is driven toward the right side in the diagram from a start position of the hill-climb driving, it is detected that the AF evaluation value is decreasing after passing its peak (maximum), as shown by an arrow A. In this case, the hill-climb driving operation is ended due to the in-focus point having been passed, and thereafter the focusing lens 105 is returned to the position at which the maximum AF evaluation value was obtained (FIGS. 5, S507 and S508), and the processing shifts to the minute driving operation (S502).

On the other hand, in the case where the focusing lens 105 is driven to the left side in the diagram from the start position of the hill-climb driving, it is detected that the AF evaluation value is decreasing without having passed its peak, as shown by an arrow B. In this case, it is judged that the focusing lens 105 was moved in the wrong direction, and the hill-climb driving operation is continued in the opposite direction. Note that, in the hill-climb driving, the amount of movement of the focusing lens 105 per fixed period of time is greater than at the time of the abovementioned minute driving operation.

In this way, the control unit 114 executes an AF control operation for moving the focusing lens 105 to a position at which the AF evaluation value is maximized, while repeatedly performing the following processing in order: restart determination (determination as to whether to start the procedure again from minute driving)→minute driving→hill-climb driving→minute driving→restart determination.

Next, the in-focus direction determination processing of S502B and S505B will be described, using FIG. 10 and FIGS. 2A to 2C.

At S1001, the control unit 114 determines whether a human body region is detected by the human body detection unit 119. The control unit 114 advances to S1002 if a human body region is detected, and ends the processing if a human body region is not detected.

At S1002, the control unit 114 sets the focusing area (AF frame) for direction determination to the human body region. This processing will be described using FIGS. 2A to 2C. As described above, only a human body is detected with respect to the subject 200A in FIG. 2A, and a face is not detected. Also, the subject 200B is within the fixed AF frame 202 whose position is set in advance to middle of the screen. In this state, focus detection is performed with the subject 200B within the fixed AF as the primary subject. On the other hand, the AF frame 203 for direction determination is set, utilizing the human body detection result of the subject 200A. Note that the AF frame 203 for direction determination can be set to an arbitrary location of the human body region, such as a torso or a face, for example. Also, in the case where a plurality of human body regions are detected, an AF frame for direction determination may be set for each human body region, and in-focus directions may be determined with regard to the individual human body regions.

Next, the control unit 114, at S1003, acquires AF evaluation values within the AF frame 203 for direction determination from the AF signal processing circuit 113.

At S1004, the control unit 114 determines whether the focusing lens is currently being driven by minute driving, and transitions the processing to S1005 in the case of minute driving, and otherwise to S1009. In other words, at S502B the processing from S1005 is executed, and at S505B the processing from S1009 is executed.

At S1005, the control unit 114 determines the in-focus direction, with the same principles as for direction determination in minute driving. This will be described using FIGS. 2A to 2C. A line 205 in FIG. 2C shows the change in focusing lens positions at the time of minute driving. At the time of minute driving, the focusing lens is periodically moved in the infinity direction and the close-up direction within a minute range defined in advance. A line 206 shows the change in AF evaluation values within the fixed AF frame 202 at the time of minute driving in simplified form. In the state of FIG. 2A, since the subject 200B is being focused on, there is little change in evaluation values following minute driving.

On the other hand, a line 207 shows the change in AF evaluation values within the AF frame 203 for direction determination in the same period in simplified form. Although the evaluation values within the AF frame 203 for direction determination also depend on the amount of blurring of the subject that is set, the evaluation values tends to increase when the focusing lens approaches the in-focus position of the subject. In the example in FIG. 2C, since the AF evaluation values increase when the focusing lens moves in the infinity direction, it is highly likely that the subject 200B to which the AF frame 203 for direction determination is set exists more in the infinity direction than the subject 200A that is currently being focused on. Thus, it can be determined that the in-focus direction of the subject 200B is in the infinity direction.

At S1005, the control unit 114 determines whether the in-focus direction determined based on the AF evaluation values within the AF frame 203 for direction determination are continuously the same for N times, and respectively transitions the processing to S1006 if the same in-focus direction is determined continuously for N times or more, and otherwise to S1007. Note that the reliability of the in-focus direction determination can be enhanced by setting the value of N at S1005 to 2 or more.

At S1006, the control unit 114 stores a flag or data indicating the determined in-focus direction in an internal memory or the like.

On the other hand, at S1009, the control unit 114 monitors the change in AF evaluation values within the AF frame 203 for direction determination similarly to when hill-climb driving is performed, and determines whether the AF evaluation value has increased or decreased compared to the previous AF evaluation value continuously for K times. In the case where the AF evaluation value has increased compared to the previous AF evaluation value continuously for K times, it is highly likely that the subject 200A exists in the same direction as the driving direction of the focusing lens at that point in time. In other words, the control unit 114 determines the focusing lens driving direction to be the in-focus direction. Also, since it is highly likely that the subject 200A exists in the opposite direction to the driving direction of the focusing lens in the case where the AF evaluation value decreased compared to the previous AF evaluation value continuously for K times, the control unit 114 determines the opposite direction to the focusing lens driving direction to be the in-focus direction. Note that the reliability of the in-focus direction determination can be enhanced by setting the value of K to 2 or more.

At S1010, the control unit 114 stores a flag or data indicating the determined in-focus direction in an internal memory or the like.

At S1007, the control unit 114 determines whether the in-focus direction was determined during the hill-climb driving. That is, if a flag or data indicating the in-focus direction is stored at S1010, it is determined that the in-focus direction was determined. Since the amount of movement of the focusing lens is greater with hill-climb driving than with minute driving, the reliability of change in AF evaluation values is higher than when minute driving is performed, and priority is given to the in-focus direction determined during hill-climb driving.

Therefore, if the in-focus direction is determined during hill-climb driving, the control unit 114, at S1008, stores the in-focus direction determined during the hill-climb driving as the in-focus direction of the subject 200A.

On the other hand, if the in-focus direction is not determined during hill-climb driving, the control unit 114, at S1011, determines whether the in-focus direction was determined during minute driving. That is, if a flag or data indicating the in-focus direction is stored at S1006, it is determined that the in-focus direction was determined. If the in-focus direction was determined during minute driving, the control unit 114, at S1012, stores the in-focus direction determined during minute driving as the in-focus direction of the subject 200A.

In the case where the in-focus direction is not determined during either hill-climb driving or the minute driving, the control unit 114, at S1013, determines not to utilize the in-focus direction.

Next, AF control processing when switching focusing areas at S305 will be described, using the flowchart of FIG. 11.

At S1101, the control unit 114 determines whether the focusing area set at S302 includes a face region, and respectively transitions the processing to 51110 if a face region is not included and to S1102 if a face region is included. Note that a face region may be determined to be included if a portion of a face region is included, or may be determined to be included only in the case where an entire face region is included. The determination condition may also be changed depending on the size of the face region, for example.

At S1110, the control unit 114 determines whether the focusing area includes a human body region. In the case where a human body region is not included, the in-focus direction of the AF frame 203 for direction determination is not known, and thus the control unit 114 transitions the processing to S1111, and performs conventional AF control described using FIG. 5. On the other hand, in the case where the focusing area includes a human body, it is highly likely that the in-focus direction relating to that human body has been determined, and thus the control unit 114 transitions the processing to S1105.

On the other hand, in the case where the focusing area includes a face region, the control unit 114, at S1102 and S1103, determines whether the same subject is included in the AF frame (focusing area) set based on the face region and the AF frame 203 for direction determination set based on the human body region. Note that, here, the AF frame 203 for direction determination set based on a human body region is assumed to be set to a face region estimated from the human body region.

The control unit 114 then respectively determines in S1102 whether the positions are correlated and in S1103 whether the sizes are correlated, with regard to the AF frame 203 for direction determination and the focusing area set based on the face region. In the case where there is a predetermined correlation with regard to both position and size, the control unit 114, at S1104, determines that both the AF frame 203 and the focusing area have been set for the same subject, and transitions the processing to S1105. In the case where there is no predetermined correlation with regard to at least one side of position and size, the AF frame 203 for direction determination is not set for the subject to which the focusing area was set based on the face region, and the in-focus direction is not determined. Therefore, the control unit 114 transitions the processing to S1109, and performs conventional AF control.

At S1105, the control unit 114 determines whether the in-focus direction has been determined with regard to the AF frame 203 for direction determination that is related to the same subject as the set focusing area. The control unit 114 then transitions the processing to S1106 if the in-focus direction has been determined, sets the driving direction of the focusing lens to the in-focus direction that has been determined, transitions the processing to S1107, and starts hill-climb driving. On the other hand, in the case where the in-focus direction has not been determined, the control unit 114 transitions the processing to S1108, and performs conventional AF control.

Note that, in S1102 and S1103, correlation may be determined with regard to positions and sizes of the face region that are estimated from the human body region to which the AF frame 203 for direction determination is set and the face region to which the focusing area is set.

Note that the configuration of the present embodiment is also useful in the case where face detection cannot be performed such as when a subject that should be the primary subject is facing the side or has his or her back turned.

Figure 12A:
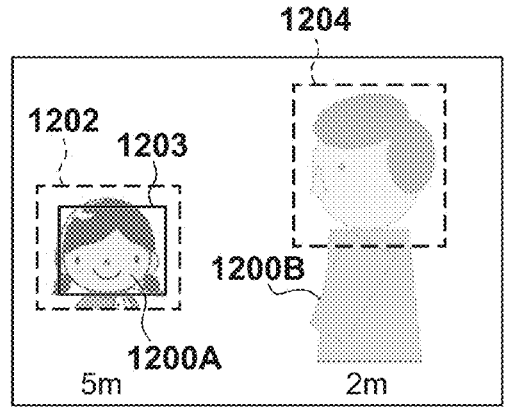
FIGS. 12A to 12D are diagrams illustrating effects of an embodiment of the present invention.

FIG. 12A shows an exemplary scene in which there are subjects 1200A and 1200B, with the subject 1200A assumed to be at a distance of 5 m, and the subject 1200B assumed to be at a distance of 2 m. Generally, in the case where a plurality of faces are detected, the subject with the largest face, that is, the near subject, is often set as the primary subject, but in the example shown in FIG. 12A, since the near subject 1200B is turned to the side, a face region is detected only for the subject 1200A. The subject 1200B is detected from its contour as being a human body.

In this case, the subject 1200A with respect to which the only face region is detected is determined as the primary subject, and a face frame 1203 is displayed in a superimposed manner, together with setting an AF frame 1202 internally based on the face region. Also, with regard to the subject 1200B, an AF frame 1204 for direction determination is set based on a face region that is estimated from the human body region.

The in-focus direction with regard to the subject 1200B is determined as described above, utilizing a focus-detecting operation on the AF frame 1202. In this case, since the distance of the subject 1200A is 5 m and the distance of the subject 1200B is 2 m, the AF evaluation value within the AF frame 1204 for direction determination increases when the focusing lens is moved to the close-up side, and the in-focus direction can be determined as being the close-up direction.

Figure 12B:
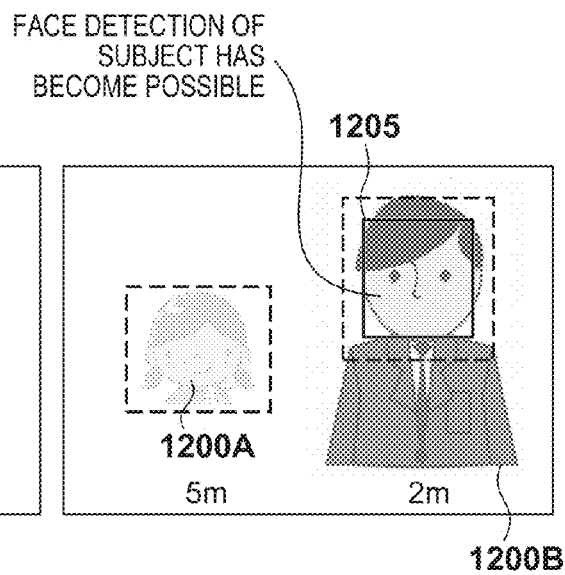

Thereafter, when the subject 1200B turns to the front as shown in FIG. 12B, enabling a face to be detected, the subject 1200B having a larger face region than the subject 1200A is determined as the primary subject, and an AF frame 1205 will be set.

Figure 11:
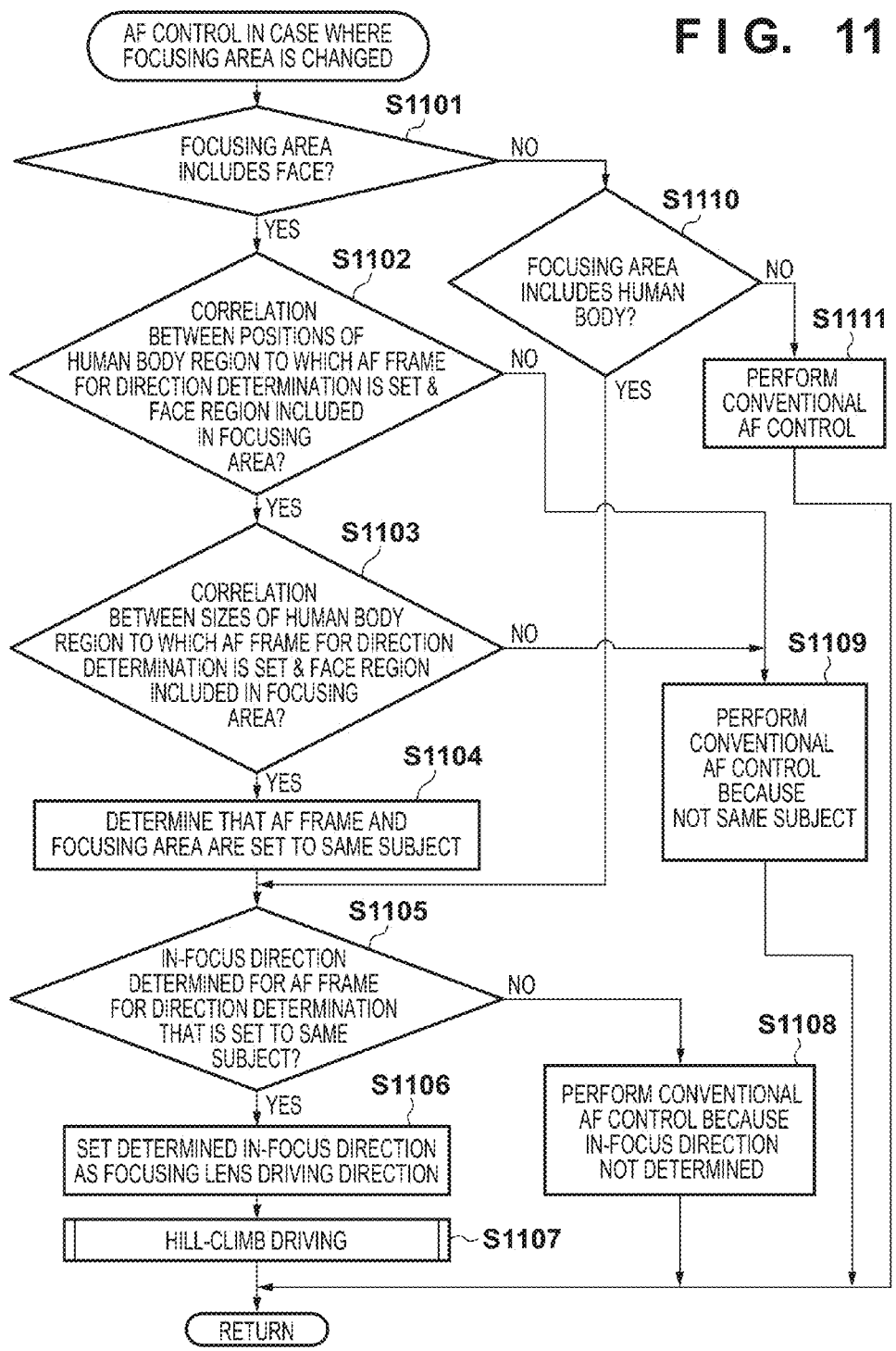
FIG. 11 is a diagram showing AF control when switching focusing areas of an embodiment of the present invention.

The AF control described using FIG. 11 is executed as a result of the focusing area having been changed. With regard to the subject 1200B to which the AF frame 1205 has been newly set, the AF frame 1204 for direction determination has been set, and it has also been determined that the in-focus direction is the close-up direction. Accordingly, in the focus-detecting operation with regard to the AF frame 1205, minute driving and direction determination can be omitted, and hill-climb driving in the close-up direction can be performed immediately. The primary subject (subject 1200B) can thereby be focused on quicker than was conventionally possible.

Also, the configuration of the present embodiment is useful in the case where the user designates the primary subject.

Figure 12C:
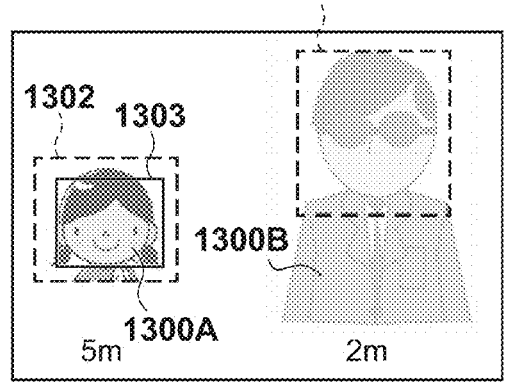

FIG. 12C shows a similar scene to FIG. 12A, but a face of a near subject 1300B was not detected due to accessories rather than the orientation of the face, and a face region is detected only with regard to a subject 1300A. The subject 1300B is detected from its contour as being a human body.

In this case, the subject 1300A with respect to which the only face region is detected is determined as the primary subject and a face frame 1303 is displayed in a superimposed manner, together with setting an AF frame 1302 internally based on the face region. Also, with regard to the subject 1300B, an AF frame 1304 for direction determination is set based on a face region estimated from the human body region.

Note that a face of the subject 1300B may also be detected in a state where the subject 1300A is determined to be the primary subject.

The in-focus direction with regard to the subject 1300B is determined as describe above, utilizing a focus-detecting operation on the AF frame 1302. In this case, since the distance of the subject 1300A is 5 m and the distance of the subject 1300B is 2 m, the AF evaluation value within the AF frame 1304 increases when the focusing lens is moved to the close-up side, and the in-focus direction can be determined as being the close-up direction.

Figure 12D:
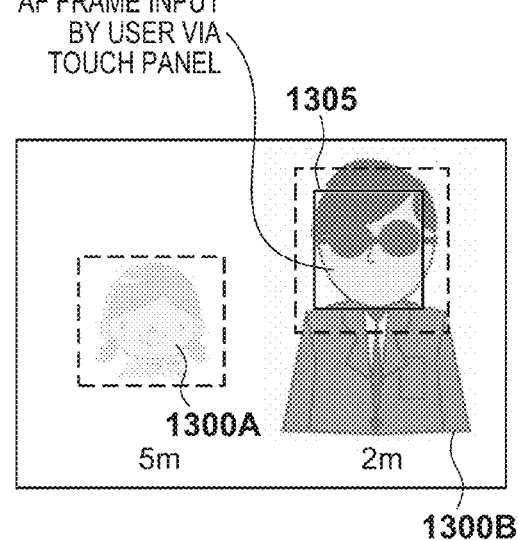

Assume that the user designates the position of the subject 1300B, using a touch panel or the like provided in the display unit 109. The control unit 114 determines the primary subject designated by the user, based on position information input by the user and information relating to the position and size of the human body region and the face region that are detected. Here, since there is a correlation between the human body region detected with regard to the subject 1300B and the position input by the user, the subject 1300B is determined as the primary subject, and an AF frame 1305 is set to the face region that is estimated from the human body region (FIG. 12D).

Since there was a change in the focusing area, the operations of FIG. 11 are performed. In this case, with regard to the subject 1300B that has newly become the primary subject, the AF frame 1304 for direction determination has been set, and it has already been determined that the in-focus direction is the close-up direction. Accordingly, with the focus-detecting operation with regard to the AF frame 1305, minute driving and direction determination can be omitted, and hill-climb driving in the close-up direction can be performed immediately. The primary subject (subject 1300B) can thereby be focused on quicker than was conventionally possible.

According to the present embodiment, as described above, in the case where a predetermined subject can be detected with a first detection method but cannot be detected with a second detection method, the AF evaluation value with regard to a subject region detected with the first detection method is monitored, and the in-focus direction is determined. In the case where, when the subject becomes detectable with the second detection method, the in-focus direction has been determined with regard to the same subject as the subject detected by the second detection method, the focus-detecting operation is started using the determined in-focus direction, thus enabling the focus-detecting operation to be sped up. Also, as a result of the in-focus direction determination using AF evaluation values obtained by a normal focus-detecting operation, the focusing lens does not need to be driven in order to determine the in-focus direction, and the image quality of images that are recorded is not affected even during moving image recording.

Other Embodiments

Although the above-mentioned embodiment only described the case where one human body region was detected in order to simplify the description, in the case where a plurality of human body regions are detected, a plurality of the AF frames for direction determination can be set, and in-focus directions can be determined with the individual AF frames for direction determination. In this case, when a face becomes detectable, the likelihood of the in-focus direction having been determined with regard to the subject whose a face was detected can be enhanced.

Also, the embodiments described above are merely illustrative, and various modifications may be made within the scope of the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283666, filed on Dec. 26, 2012, which is hereby incorporated by reference herein in its entirety.

What is claimed is:

1. An automatic focus detection apparatus comprising:
a first detection unit configured to detect a region of a first detection target from an image;
a second detection unit configured to detect, from an image, a region of a second detection target in which the first detection target is estimable;
a generation unit configured to generate a focusing signal, based on a signal corresponding to a focusing area set within an image; and
a control unit configured to control movement of a focusing lens, based on the focusing signal,
wherein the control unit determines a first in-focus direction based on a signal corresponding to a region of the second detection target detected in a first period,
wherein, in a case where a focusing area set in a second period that is after the first period, corresponds to the region of the second detection target detected in the first period, the control unit controls the focusing lens to move in the first in-focus direction, and
wherein the first detection target is a face of a person, and the second detection target is a torso of a person.

2. The automatic focus detection apparatus according to claim 1, wherein the control unit controls the focusing lens to move in a direction in which the focusing signal increases in a first mode.

3. The automatic focus detection apparatus according to claim 2, wherein, in a case where the focusing area set in the second period corresponds to the region of the second detection target detected in the first period, the control unit controls the focusing lens to move in the first in-focus direction in the first mode.

4. The automatic focus detection apparatus according to claim 3,
wherein the control unit determines a second in-focus direction by performing minute driving of the focusing lens in a second mode, and
wherein, in a case where the focusing area set in the second period does not correspond to the region of the second detection target detected in the first period, the control unit determines the second in-focus direction by the second mode, and controls the focusing lens to move in the second in-focus direction in the first mode.

5. The automatic focus detection apparatus according to claim 2,
wherein the control unit determines a second in-focus direction by performing minute driving of the focusing lens in a second mode, and
wherein, in a case where the focusing area set in the second period does not include the region of the first detection target or the region of the second detection target, the control unit determines the second in-focus direction by the second mode, and controls the focusing lens to move in the second in-focus direction in the first mode.

6. The automatic focus detection apparatus according to claim 2, wherein, in a case where it is determined that there is a correlation between the region of the second detection target detected in the first period and the region of the first detection target corresponding to the focusing area set in the second period, the control unit controls the focusing lens to move in the first in-focus direction in the first mode.

7. The automatic focus detection apparatus according to claim 1, wherein a reliability of a detection result of the second detection unit is lower than a reliability of a detection result of the first detection unit.

8. An image pickup apparatus comprising:
the automatic focus detection apparatus according to claim 1;
an image pickup unit that captures an image; and
a drive unit that drives the focusing lens.

9. A method of controlling an automatic focus detection apparatus, comprising:
a first detection step of detecting a region of a first detection target from an image;
a second detection step of detecting, from an image, a region of a second detection target in which the first detection target is estimable;
a generation step of generating a focusing signal, based on a signal corresponding to a focusing area set within an image; and
a control step of controlling movement of a focusing lens based on the focusing signal,
wherein, in the control step, a first in-focus direction is determined based on a signal corresponding to a region of the second detection target detected in a first period,
wherein, in a case where a focusing area set in a second period that is after the first period, corresponds to the region of the second detection target detected in the first period, in the control step, the focusing lens is controlled to move in the first in-focus direction, and
wherein the first detection target is a face of a person, and the second detection target is a torso of a person.

10. A non-transitory computer-readable recording medium storing a program for causing a computer to function as respective units of an automatic focus detection apparatus comprising:
a first detection unit configured to detect a region of a first detection target from an image;
a second detection unit configured to detect, from an image, a region of a second detection target in which the first detection target is estimable;
a generation unit configured to generate a focusing signal, based on a signal corresponding to a focusing area set within an image; and
a control unit configured to control movement of a focusing lens, based on the focusing signal,
wherein the control unit determines a first in-focus direction based on a signal corresponding to a region of the second detection target detected in a first period,
wherein, in a case where a focusing area, set in a second period that is after the first period, corresponds to the region of the second detection target detected in the first period, the control unit controls the focusing lens to move in the first in-focus direction, and
wherein the first detection target is a face of a person, and the second detection target is a torso of a person.

11. An automatic focus detection apparatus comprising:
a microcomputer configured to implement functions of a first detection unit, a second detection unit, a generation unit, and a control unit, wherein:
the first detection unit is configured to detect a region of a first detection target from an image;
the second detection unit is configured to detect, from an image, a region of a second detection target in which the first detection target is estimable;
the generation unit is configured to generate a focusing signal, based on a signal corresponding to a focusing area set within an image; and
the control unit is configured to control movement of a focusing lens, based on the focusing signal,
wherein the control unit determines a first in-focus direction based on a signal corresponding to a region of the second detection target detected in a first period,
wherein, in a case where a focusing area, set in a second period that is after the first period, corresponds to the region of the second detection target detected in the first period, the control unit controls the focusing lens to move in the first in-focus direction, and
wherein the first detection target is a face of a person, and the second detection target is a torso of a person.

12. The automatic focus detection apparatus according to claim 11, wherein the control unit controls the focusing lens to move in a direction in which the focusing signal increases in a first mode.

13. The automatic focus detection apparatus according to claim 12, wherein, in a case where the focusing area set in the second period corresponds to the region of the second detection target detected in the first period, the control unit controls the focusing lens to move in the first in-focus direction in the first mode.

14. The automatic focus detection apparatus according to claim 13,
wherein the control unit determines a second in-focus direction by performing minute driving of the focusing lens in a second mode, and
wherein, in a case where the focusing area set in the second period does not correspond to the region of the second detection target detected in the first period, the control unit determines the second in-focus direction by the second mode, and controls the focusing lens to move in the second in-focus direction in the first mode.

15. The automatic focus detection apparatus according to claim 12,
wherein the control unit determines a second in-focus direction by performing minute driving of the focusing lens in a second mode, and
wherein, in a case where the focusing area set in the second period does not include the region of the first detection target or the region of the second detection target, the control unit determines the second in-focus direction by the second mode, and controls the focusing lens to move in the second in-focus direction in the first mode.

16. The automatic focus detection apparatus according to claim 12, wherein, in a case where it is determined that there is a correlation between the region of the second detection target detected in the first period and the region of the first detection target corresponding to the focusing area set in the second period, the control unit controls the focusing lens to move in the first in-focus direction in the first mode.

17. The automatic focus detection apparatus according to claim 11, wherein a reliability of a detection result of the second detection unit is lower than a reliability of a detection result of the first detection unit.

18. An image pickup apparatus comprising:
the automatic focus detection apparatus according to claim 11;
an image pickup device that captures an image; and
a driver that drives the focusing lens.

19. A non-transitory computer-readable recording medium storing a program for causing a computer to function as respective units of an automatic focus detection apparatus comprising:
a microcomputer configured to implement functions of a first detection unit, a second detection unit, a generation unit, and a control unit, wherein:

the first detection unit is configured to detect a region of a first detection target from an image;

the second detection unit is configured to detect, from an image, a region of a second detection target in which the first detection target is estimable;

the generation unit is configured to generate a focusing signal, based on a signal corresponding to a focusing area set within an image; and the control unit is configured to control movement of a focusing lens, based on the focusing signal, wherein the control unit determines a first in-focus direction based on a signal corresponding to a region of the second detection target detected in a first period, wherein, in a case where a focusing area, set in a second period that is after the first period, corresponds to the region of the second detection target detected in the first period, the control unit controls the focusing lens to move in the first in-focus direction, and wherein the first detection target is a face of a person, and the second detection target is a torso of a person.

* * * * *